Feb. 14, 1967 D. D. JOHNSON ETAL 3,304,544

RANDOM ACCESS MAGNETIC MEMORY UNIT HOUSING

Filed Dec. 27, 1962 2 Sheets-Sheet 2

INVENTORS
DONALD D. JOHNSON
VLADIMIR M. LIESKOVSKY
BY WILBUR E. TIBBETTS

Robert B. Crouch
ATTORNEY 3,304,544

RANDOM ACCESS MAGNETIC MEMORY UNIT HOUSING

Donald D. Johnson, Los Gatos, Vladimir M. Lieskovsky, Palo Alto, and Wilbur E. Tibbetts, San Jose, Calif., assignors to International Business Machines Corporation, New York, N.Y., a corporation of New York Filed Dec. 27, 1962, Ser. No. 247,597
2 Claims. (Cl. 340—174.1)

This invention relates to a random access magnetic memory unit for data processing machines and more particularly to a disk memory unit which is permanently enclosed in a housing and which is easily and quickly engaged from a disk drive unit.

Random access memories have been suggested in the past which include assemblies of one or more magnetic disks. These disk assemblies are adapted to be mounted on a disk drive unit for read/write activity and then replaced and put in storage while another disk assembly is similarly mounted. Since the disk assemblies are manually mounted on and removed from the disk drive and manually placed in and withdrawn from storage, an enclosure is generally provided for each assembly to protect the magnetic recording surfaces from physical damage and from contamination from dust and other environmental factors. While the disk assembly must be protected, it must also be readily engaged with the disk drive unit. It must also allow one or more transducers to come into close proximity with the recording surfaces of the assembly. In the past, the conflicting requirements of protection and ready accessibility have been satisfied by provision of a removable cover or housing for the disk assembly. This housing is removed when the asembly is positioned on the drive unit and then replaced when the assembly is detached and placed in storage. This approach is entirely practical for many applications of a disk assembly, since the time consumed in replacing one disk assembly with another is generally only a very small portion of the overall operating time. However, there are applications for disk assemblies where this approach is not always feasible, since the time spent in attaching and detaching the protective cover becomes a significant portion of the overall machine operating time.

An object of the present invention is to provide a random access magnetic memory unit which can be quickly and easily engaged with or disengaged from a disk drive unit.

The above object is realized in the present invention by provision of an interchangeable magnetic memory unit which incorporates a magnetic disk assembly permanently mounted in a protective housing. In this unit, one or more magnetic disks are mounted on a spindle which is attached at one extremity to a coupling member. The disk or disks are assembled in a protective housing with the spindle extending through one wall thereof and the coupling member positioned on the exterior of the housing. Means are provided for precisely aligning the spindle with a motor driven shaft on a disk drive unit and then affecting driving engagement between the coupling member and the shaft. Additional means is provided for allowing introduction of transducers into the interior of the housing and into proximity with the recording surfaces of the disks.

The foregoing and other objects, features and advantages of the invention will be apparent from the following more particular description of a preferred embodiment of the invention, as illustrated in the accompanying drawings.

Figure 1:
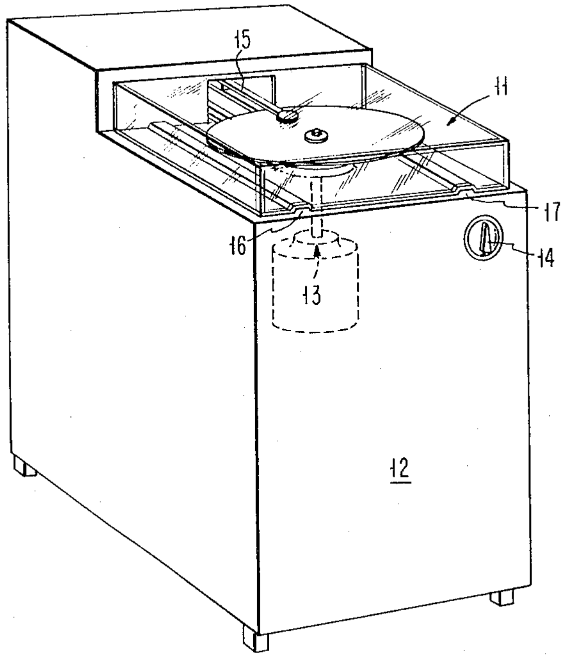
FIG. 1 is a perspective view of a memory unit according to the present invention mounted on a disk drive unit.
Figure 5:
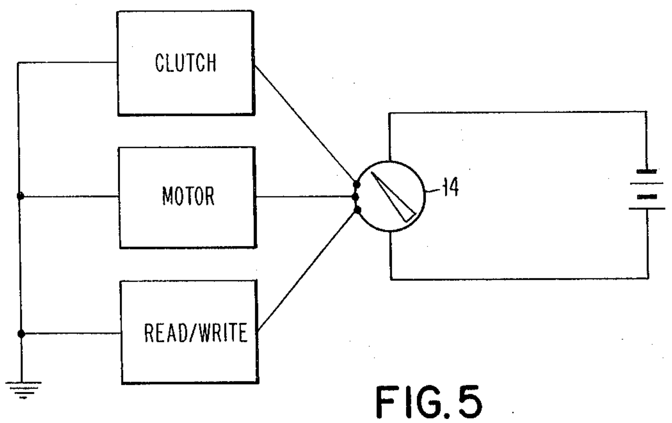
FIG. 5 is a schematic view of circuitry for operating the present memory unit.

Referring to FIG. 1 of the drawing, a memory unit 11 is illustrated in position on a disk drive unit 12. The drive unit 12 includes a frame work which supports a motor assembly 13, a control switch 14, a transducer support assembly 15 and a pair of guide rails 16–17. As illustrated, the memory unit is supported on the rails 16 and 17 with the transducer support assembly protruding into the interior of the memory unit.

Figure 2:
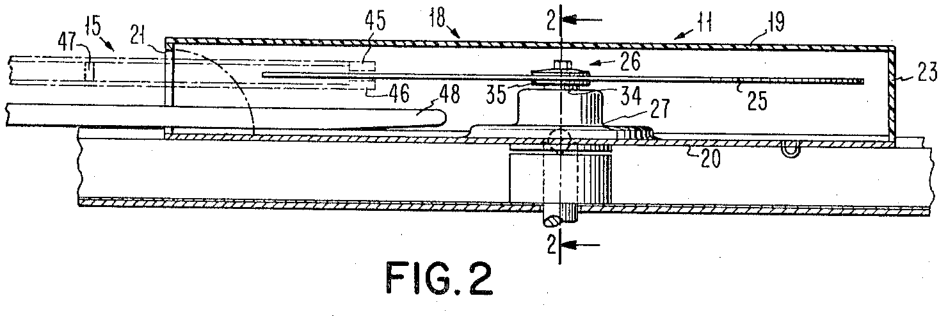
FIG. 2 is an elevation view at an enlarged scale of the present memory unit in operating position on the disk drive.
Figure 3:
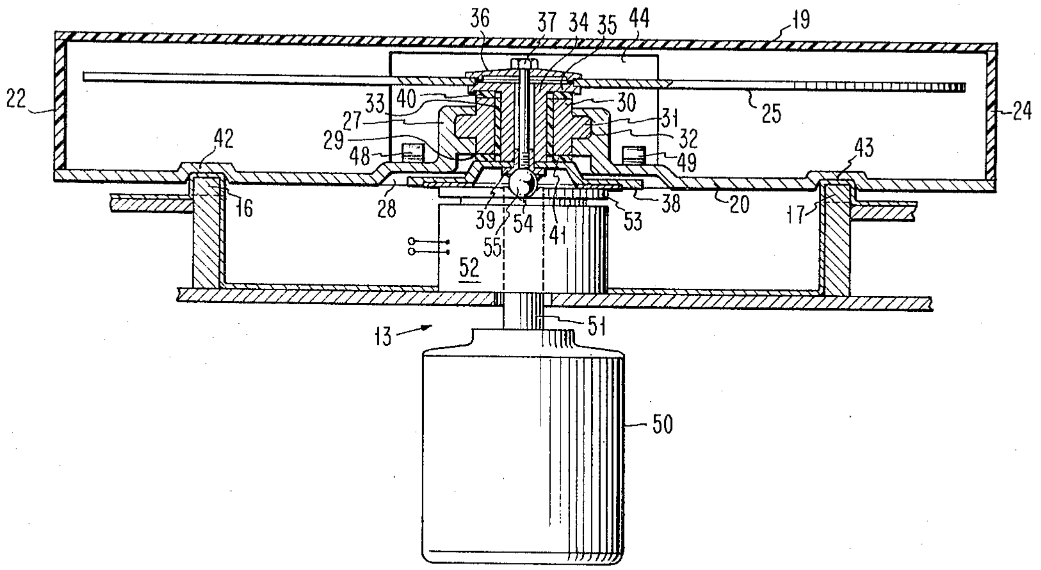
FIG. 3 is a sectional view along lines 2—2 of FIG. 2.

As shown in FIGS. 2 and 3, the memory unit includes a housing 18 comprised of upper and lower lateral surfaces 19 and 20 and four vertically extending side surfaces 21–24, a magnetic recording disk 25 is rotatably mounted within the housing on a spindle 26. The housing is formed of any suitable material, preferably transparent plastic of sufficient strength to protect the disk from damage. The lower surface 20 of the housing is provided with a centrally located, inwardly extending boss 27 which defines a generally circular recess 28 surrounding a bore 29. An annular collar 30 is mounted in the bore 29 and held in place by means of a rib 31 received in an annular slot 32 in boss 27. A cylindrical bushing 33 is pressed into the collar 30 and provides a bearing surface for a sleeve 34 received therein. The sleeve 34 is provided with a radially extending flange 35 at its upper extremity. The upper surface of the flange is reduced slightly and is received within a central opening in the disk 25. The flange 35 thus forms an annular seat to support the disk. A washer 36 is positioned above the disk and a bolt 37 is passed through aligned openings in the washer and the sleeve 34. A generally circular coupling member 38 is received in recess 28 and positioned against the lower surface of sleeve 34. The washer, sleeve and coupling member are clamped together by an annular collar 39 which is threaded onto the free end of the bolt 37. The lower surface of the flange 35 and the upper surface of the coupling member 38 are spaced from the collar 30 by means of annular sections 40 and 41 of bearing material, which are pinned to the upper and lower surfaces of the collar 30. The lower surface 20 of the housing is also formed with spaced indentations or grooves 42 and 43 which ride on rails 16 and 17. Side section 21 is provided with a hinged portion, or door, 44 which is spring-biased into alignment with the remainder of the side. A resilient seal may be provided around the periphery of the door 44 to seal the interior of the housing.

The transducer support assembly 15 includes a pair of opposed transducers 45 and 46 mounted on the distal end of a bifurcated access arm 47. Elongated bumpers 48 and 49 are mounted on the disk drive unit and extend in cantilever fashion generally parallel with rails 16 and 17. The motor assembly 13 includes an electric motor 50 which is suspended in such a fashion that the shaft 51 rotates in a vertical plane. A suitable clutch assembly 52, which is illustrated as being magnetic, is secured to shaft 51 with the movable plate 53 thereof keyed to the shaft for movement in a vertical plane. The distal end of shaft 51 is provided with a conical recess 54 which is adapted to receive a locating ball 55 which is brazed or otherwise secured in collar 39.

Figure 4:
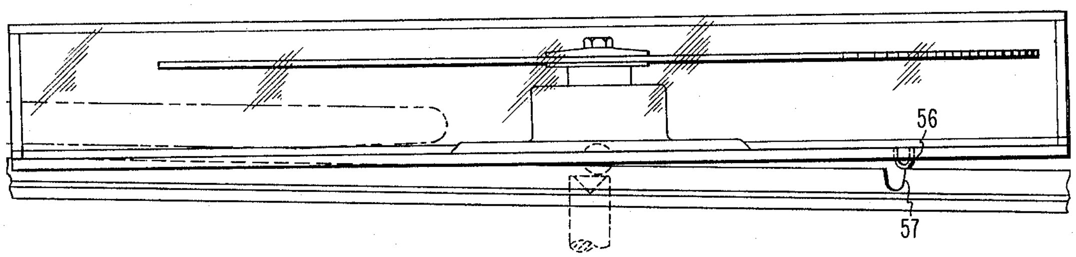
FIG. 4 is an elevation view illustrating the manner in which the memory unit is engaged with the disk drive.

In the operation of the present invention the memory unit is positioned at the front of the disk drive unit with grooves 42 and 43 aligned on rails 16 and 17. The memory unit is then slid toward the rear of the drive unit with the grooves riding on the rails. As the memory unit is advanced, bumpers 48 and 49 bear against door 44, causing it to pivot inwardly as shown in FIG. 2. The memory unit continues to ride along the rails as shown in FIG. 4 with a side 23 elevated on locating projections 56, which protrude downwardly from the grooves. When the spindle 26 is aligned with the axis of rotation of shaft 51, projections 56 drop into depressions 57 in the guide rails. This allows the locating ball 55 to be received within conical recess 54. The locating ball centers itself within the conical recess to precisely align the axis of rotation of the spindle 26 with that of the shaft 51. Control switch 14, which is illustrative of any means for making two or more contacts in serial fashion, is then advanced to energize the magnetic clutch 52 and cause the movable plate 53 to rise into driving engagement with the circular coupling member 38. Further rotation of the control switch energizes motor 50 to rotate the disk 25, and the final position of the control switch energizes the transducer assembly to enable the read/write circuits or to load the transducers into operating condition with the upper and lower surfaces of the disk. The memory unit is then in condition for data to be processed into and out of the disk. To remove the memory unit from the disk drive unit, the control switch is rotated clockwise to first de-energize the transducer assembly, then cut power to the motor and finally de-energize the magnetic clutch. The side 23 of the housing is then elevated slightly to lift projections 56 from depressions 57 and the memory unit withdrawn with the grooves in contact with the guide rails. As the housing is withdrawn from the drive unit, the door 44 will close automatically as the bumpers clear the side 21.

The guide rails and grooves serve to locate the memory unit on the disk drive unit and to prevent the housing from rotating while the disk is being driven. The bearing material supports the weight of the disk and spindle when the memory unit is detached from the disk drive unit, but serves only as a rotating seal when the unit is engaged with the drive unit. Index marks are provided at intervals about the circumference of the coupling member 38 as a means of referencing specific locations on the disk. The index marks can be formed in any suitable manner, such as by radial slots which are sensed by a magnetic transducer, etc. A transparent hood may be provided on the disk drive unit if desired, so that the entire memory unit will be received within a closed space for additional protection from contamination.

While the invention has been particularly shown and described with reference to preferred embodiment thereof, it will be understood by those skilled in the art that the foregoing and other changes in the form and details may be made therein without departing from the spirit and scope of the invention.

What we claim is:

1. For use with a disk drive unit which includes a power driven shaft and a transducer support assembly mounted adjacent to and protruding toward the longitudinal axis of the shaft, a random access memory unit, comprising:

- a protective housing forming a closed structure;
- a magnetic disk assembly rotatably mounted within the housing;
- means on the housing to permit introduction of the transducer support radially of the disk assembly, said means including spring-biased door means mounted on the housing to automatically seal the housing when it is separated from the disk drive unit; and
- means exposed to the exterior of the housing for affecting driving engagement between the disk assembly and the power driven shaft.

2. For use with a disk drive unit which includes a power driven shaft and a transducer support assembly mounted adjacent to and protruding towards the longitudinal axis of the shaft, an interchangeable random access memory unit comprising:

- a protective housing forming a closed structure;
- a magnetic disk assembly rotatably mounted within the housing;
- means on the housing to permit introduction of the transducer support radially of the disk assembly, said means including spring-biased door means mounted on the housing to automatically seal the housing when it is separated from the disk drive unit;
- means exposed to the exterior of the housing for affecting driving engagement between the disk assembly and the power driven shaft; and
- means on the disk assembly for aligning the axis of rotation of the disk assembly with the longitudinal axis of the shaft.

References Cited by the Examiner

UNITED STATES PATENTS 3,229,268 1/1966 Solyst ------------ 340—174.1

BERNARD KONICK, *Primary Examiner.*

A. I. NEUSTADT, *Assistant Examiner.*